United States Patent Office 2,754,501
Patented July 10, 1956

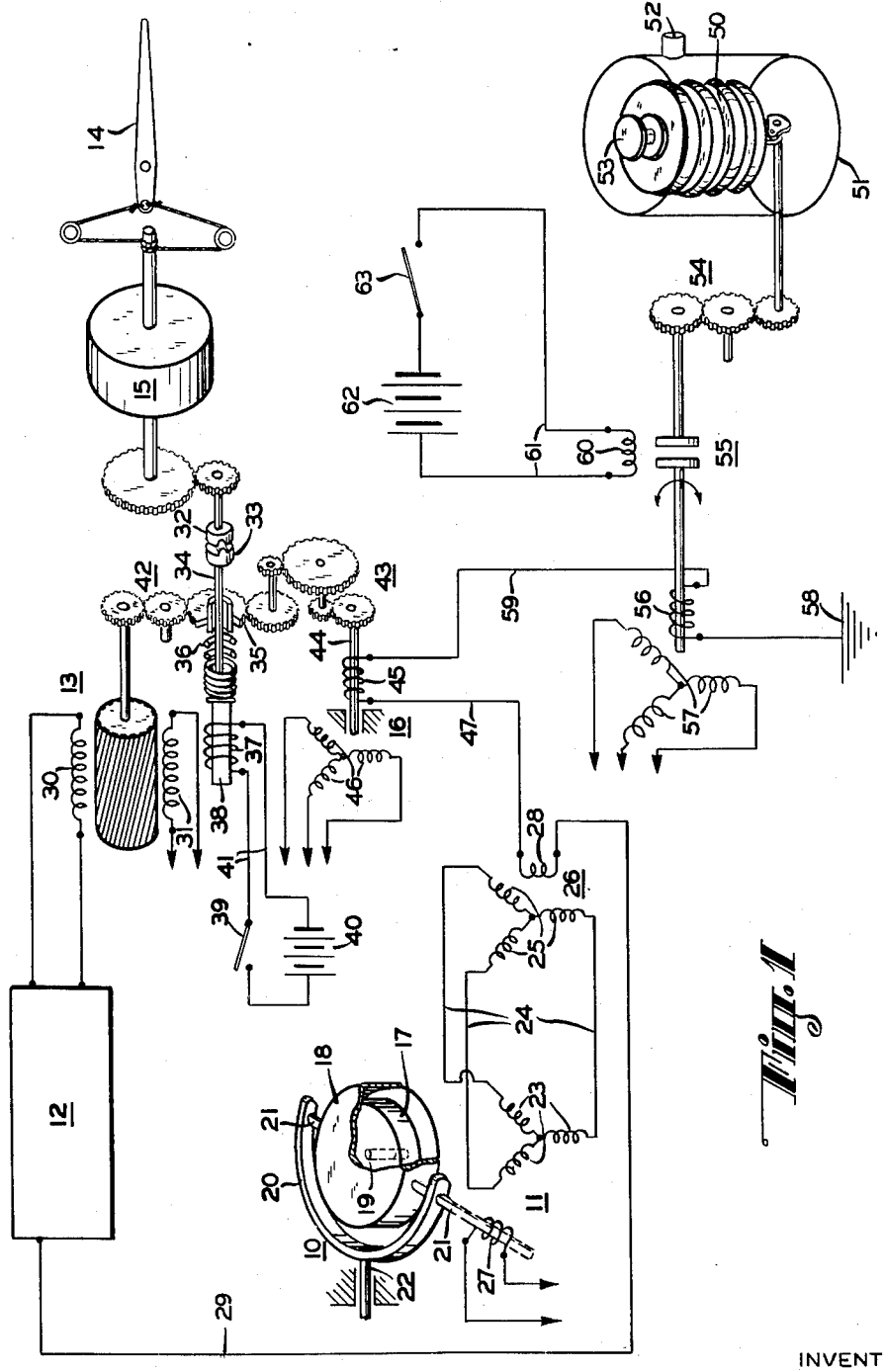

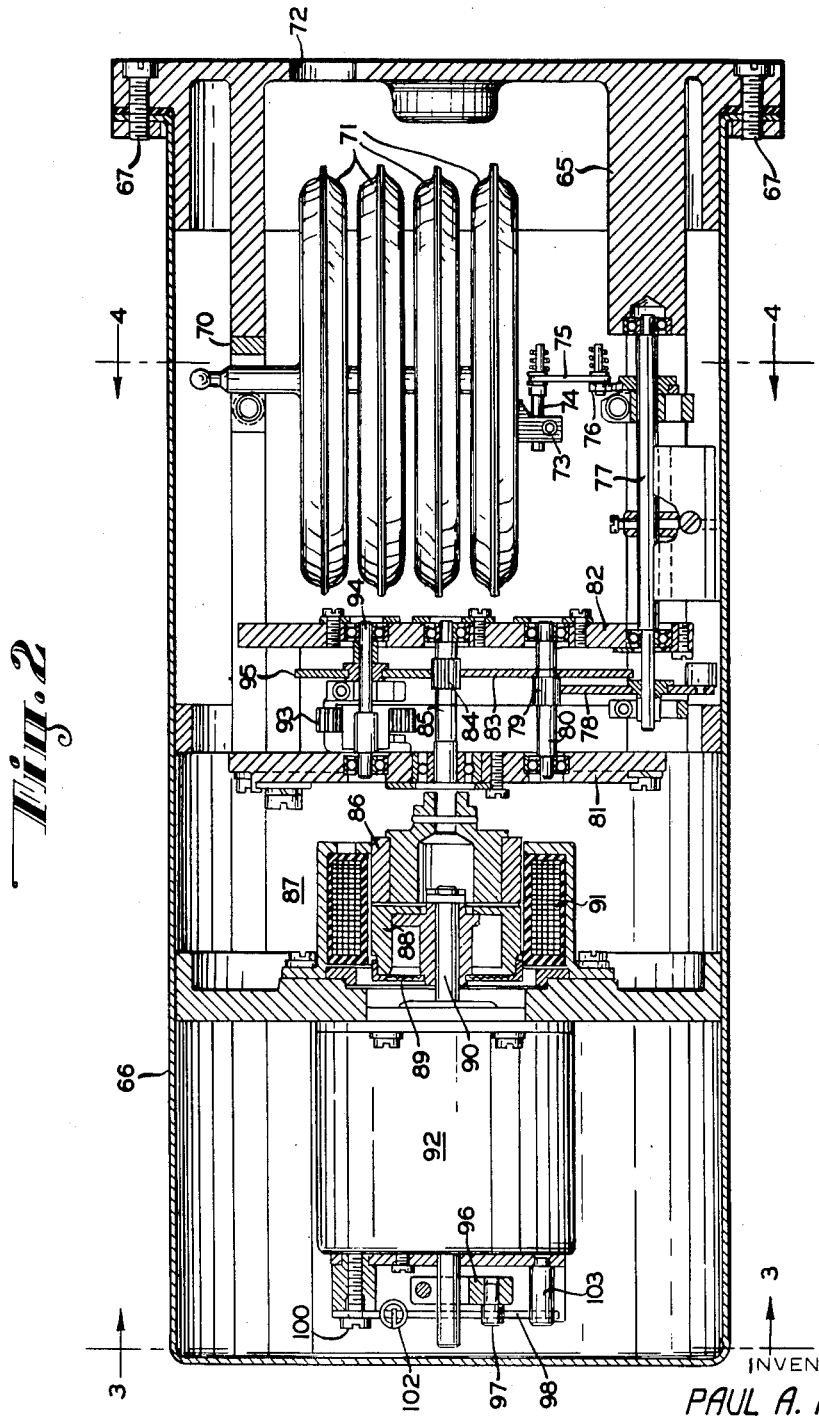

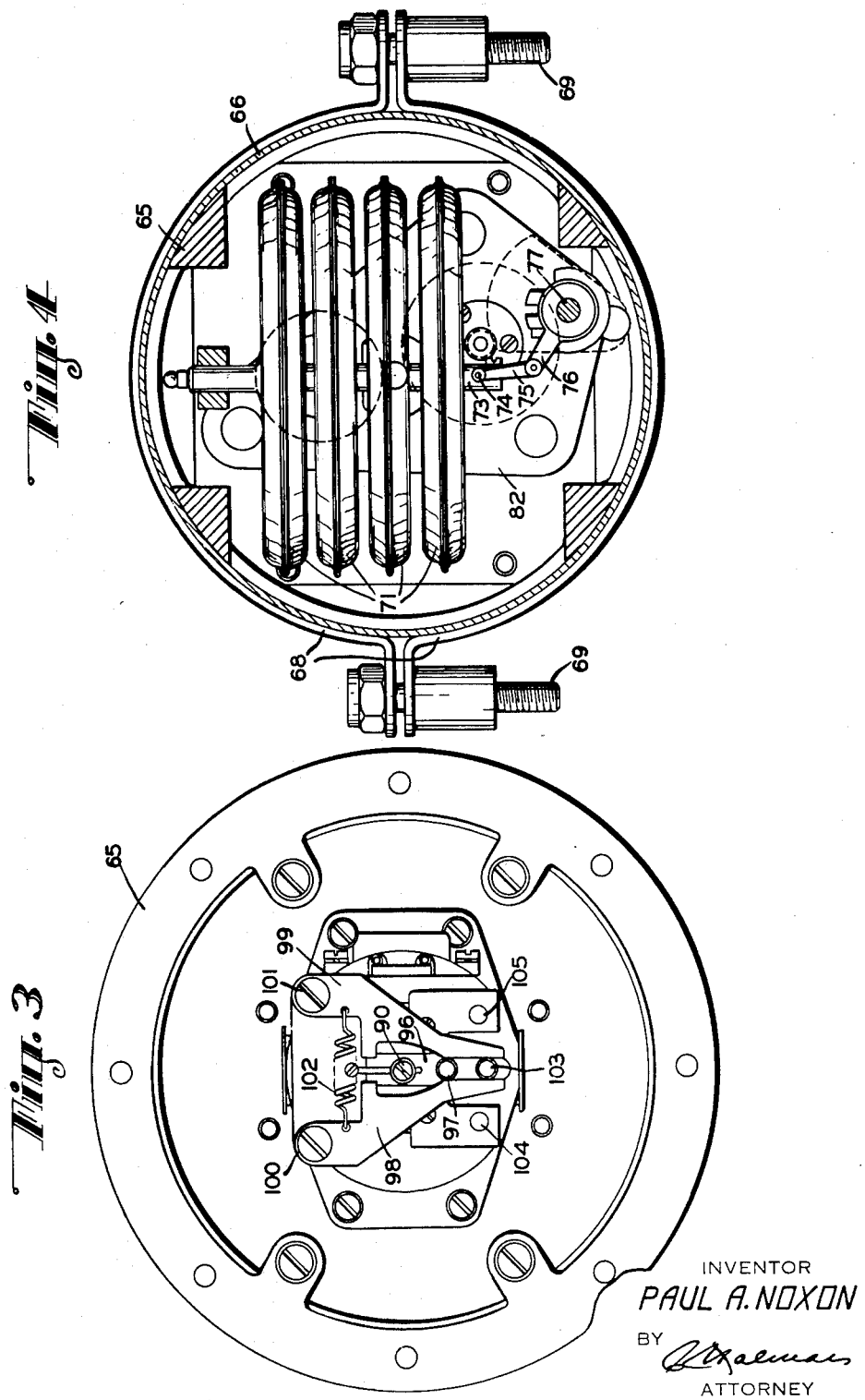

2,754,501

ALTITUDE CONTROL

Paul A. Noxon, Tenafly, N. J., assignor to Bendix Aviation Corporation, Teterboro, N. J., a corporation of Delaware Original application April 8, 1946, Serial No. 660,343. Divided and this application April 5, 1952, Serial No. 283,713

2 Claims. (Cl. 340—345)

This application is a division of application No. 660,343, filed April 8, 1946, now abandoned.

This invention relates generally to automatic steering systems for mobile craft such as aircraft, for example, and more particularly to altitude control means therefor whereby the craft will be automatically maintained not only in level flight attitude but also at a desired altitude level.

Generally, craft level flight attitude is automatically maintained by controlling elevator surfaces from a pitch take-off located at a gyro horizon which only responds to a nose-up or nose-down condition to bring the craft to the desired level attitude. Even though the gyro horizon and its pitch take-off are effective to control level craft flight, they are not able to maintain the craft at a desired flight altitude. For example, a change in craft elevation may take place due to up-drafts or down-drafts without a change in the relation between the longitudinal axis of the craft and the plane of level flight so that a relation of equilibrium will be maintained between the gyro and its take-off whereby no control is provided to the elevator.

In order to overcome this disadvantage and to automatically maintain the craft in level flight and at a desired altitude level, the novel arrangement of copending application Serial No. 660,340, filed April 8, 1946, and now U. S. Patent No. 2,552,196, issued May 8, 1951, has been proposed wherein a pressure responsive means is normally open to atmosphere on both sides thereof until a desired altitude is attained at which time one side of the pressure responsive means is closed off from atmosphere whereupon a response to a subsequent change of craft altitude a pressure differential is developed on the pressure responsive means and as a result thereof an electrical arrangement is actuated to develop a control signal to the elevator.

The present invention contemplates an improvement over the arrangement of the aforementioned application in that a pressure responsive member is provided hereby which, at all times, is closed off at one of its sides from atmosphere and is adapted for drivable connection to a signal developing inductive device through an electromagnetic clutch to drive the device in response to altitude changes occurring subsequent to clutch energization, a centering device being provided to define a synchronization feature for the system in that the device will be maintained in a null or zero position prior to each clutch energization.

An object of the present invention, therefore, is to provide a novel and desirable altitude control unit for maintaining craft flight at a desired altitude notwithstanding up-drafts and down-drafts, changes in craft loading, etc.

Another object of the invention is to provide a novel automatic steering system for mobile craft whereby the craft will be maintained automatically in a desired level attitude and at a desired altitude.

A further object is to provide a novel electric altitude control unit for an aircraft in the form of an aneroid, exposed on one side to varying atmospheric pressure, which is adapted for drivable connection with a signal generating device, the unit as a whole constituting a supplementary control for an automatic steering system.

The above and further objects and novel features of the invention will appear more fully from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

Figure 1 is a diagrammatic illustration of the attitude or elevator control portion of an automatic steering system embodying the novel altitude control arrangement of the present invention;

Figure 2 is a side elevation view, in section, of the novel altitude control unit hereof;

Figure 3 is a view taken substantially along line 3—3 of Figure 2 with the rear cover of the unit removed; and Figure 4 is a view taken substantially along line 4—4 of Figure 2.

The automatic steering arrangement hereof may be generally similar to that fully described and claimed in copending application Serial No. 516,488, filed December 31, 1943, and now U. S. Patent No. 2,625,348, issued January 13, 1953, and for a better understanding of the present invention the pitch control channel thereof only has been here illustrated. As shown diagrammatically in Figure 1 of the drawings, the control channel comprises an artificial or gyro horizon 10 provided with an electrical take-off 11 connected with the input of a conventional vacuum tube amplifier 12, the output of which, in turn, energizes a two phase induction motor 13 for actuating an elevator surface 14 through a speed reduction gearing contained within a housing 15. When energized, motor 13 likewise actuates an electrical follow-up device 16 which develops a follow-up signal for algebraic mixing with the pitch signal for modifying motor operation.

Horizon gyro 10 comprises a rotor 17 mounted within a rotor casing 18 for spinning about a normally vertical spin axis 19, any suitable erecting mechanism being provided to maintain the spin axis substantially vertical. Rotor casing 18 supports the rotor for oscillation about a first horizontal axis by its mounting within a gimbal ring 20 by way of inner trunnions 21, the rotor being further supported for oscillation about a second horizontal axis perpendicular to the first horizontal axis by reason of the gimbal being mounted by way of an outer trunnion 22 which is journaled on the craft, provided with the automatic steering arrangement hereof, or within an instrument case secured to the craft. The axis defined by the outer trunnion 22 thus constitutes the craft bank axis while the transverse axis constituted by the inner trunnions defines the craft pitch axis.

Pitch take-off 11 comprises an electrical transmitter which constitutes a three phase wound stator 23 which is connected by way of conductors 24 with a similar and remotely located three phase wound stator 25 of a pitch repeater device 26. Inductively coupled with stator 23 is a wound rotor 27 supported by one of inner trunnions 21 of the horizon gyro and energized from a suitable source of alternating current (not shown). Also inductively coupled with stator 25 is a wound rotor 28, one side of which connects by way of a lead 29 with the input of amplifier 12.

Normally, both wound rotors 27 and 28 are synchronously positioned and rotor 28 is at its electrical null, i. e., a position in which its electrical axis is normal to the resultant of the magnetic field at stator 25 so that no signal appears within rotor 28 even though current does flow in rotor 27. As soon, however, as relative displacement occurs between the horizon gyro and the craft's fore and aft axis, relative motion also occurs between stator 23 and its rotor so that varying voltages are induced within the windings of stator 23 which are communicated to the windings of stator 25. The resultant magnetic field at stator 25 is thus displaced angularly and rotor 28, no longer being normal to the new resultant field has a signal induced therein which is communicated to the amplifier and fed therefrom to energize the variable phase 30 of motor 13, the second phase 31 of which is constantly energized from a suitable source of alternating current (not shown).

Motor 13 drives elevator surface 14 through a servo clutch comprising two co-engaging faces 32 and 33, the former connecting through speed reduction gearing 15 with the elevator surface and the latter being supported by a shaft 34 within a hollow gear 35 which fixedly mounts clutch face 33 for rotation therewith but permits slidable or reciprocal motion thereof relative thereto for clutch engagement or disengagement. An extension of shaft 34 is provided with an enlarged end for retaining one end of a coil spring 36 therein, the opposite end of which abuts gear 35. Normally, spring 36 urges clutch face 33 out of engagement with clutch face 32.

For engaging the clutch and thereby defining a drivable connection between motor 13 and surface 14, a solenoid 37 is provided having a plunger 38 abutting the free end of shaft 34. Solenoid 37 is connected through a switch 39 with a battery 40 by way of leads 41 so that by closing the switch, the solenoid is energized and the plunger ejected therefrom to provide clutch engagement.

The motor, in driving clutch face 33 through a gear system 42 meshing with gear 35, also drives, through a speed reduction gear system 43, a shaft 44 carrying a wound rotor 45 thereon which is inductively coupled with a three phase wound stator 46 of electrical follow-up device 16. In this case, stator 46 is energized from a suitable source of alternating current (not shown) and normally rests in an electrical null position, i. e., one in which the electrical axis of the rotor is normal to the resultant magnetic field of stator 46. Motion of rotor 45 from its null develops a follow-up signal therein which is communicated to amplifier 12 to be there superimposed upon the pitch displacement channel, one end of the rotor being connected to the free end of wound rotor 28 by way of a lead 47 for this purpose.

With the development of a craft pitch condition, a signal proportional to the displacement of the craft's fore and aft axis relative to level flight is developed within wound rotor 28 to energize motor 13 which, assuming clutch switch 39 to be closed, deflects elevator surface 14 to start returning the craft to level flight. With the operation of motor 13, rotor winding 45 of device 16 is displaced angularly whereby a follow-up signal is induced therein to be impressed on the displacement signal. As more fully described in the aforementioned copending application, the follow-up signal builds up until it is equal and opposite to the pitch signal whereupon motor 13 is de-energized at which time elevator 14 has assumed a given deflected position. As the craft returns to its level attitude, the pitch signal diminishes within rotor 28 and the follow-up signal predominates to reverse motor 13 until the elevator surface again assumes a neutral position at which time rotor winding 45 is returned to its null position and the follow-up signal drops to zero and, since the desired condition between rotor 27 and stator 23 of take-off 11 is re-established, the signal within rotor winding 28 also drops to zero.

The system thus far described, though adapted to maintain the craft in level flight, is not capable of maintaining craft flight at a desired altitude level because at those times when the craft changes elevation without relative motion between the gyro horizon and its pitch take-off, no signal is available to actuate the elevator to return the craft to the desired altitude level. To overcome this defect and to provide a steering system whereby a given altitude level will be automatically maintained at all times, the novel arrangement hereof is provided.

Coming now to the novel altitude control expedient of the present invention, it is shown diagrammatically in Figure 1 as comprising a sealed bellows 50 mounted for expansion and contraction within a casing 51 having an opening 52 to atmosphere so that a drop in atmospheric pressure communicated to the casing will cause the bellows to expand while a rise in atmospheric pressure will cause it to contract. One end of the bellows is fixed by a member 53 to casing 51 while the movable end thereof connects through a gear system 54 and an electromagnetic clutch 55 with the wound rotor 56 of an inductive device having a three phase wound stator 57 inductively coupled with the rotor, the stator being energized from a suitable source of alternating current while one end of the rotor is grounded as shown at 58 and the other end thereof is connected in series with the free end of rotor 45 of the follow-up device by way of a lead 59. Normally, rotor 56 is at a null position, i. e., one in which its electrical axis is normal to the resultant of the magnetic field at stator 57.

Clutch 55 is provided with an actuating coil 60 which connects through leads 61 with a battery 62 through a switch 63. This switch is normally open so that clutch 55 is disengaged whereby bellows 50 may expand or contract without any effect on wound rotor 56. Once the desired craft altitude is reached, the craft is levelled off and switch 63 is closed whereupon coil 60 is energized to provide clutch engagement and, therefore, a drivable connection between the bellows and the wound rotor. Thereafter, a change in craft elevation without a change in the relation of the fore and aft axis thereof, produces a pressure change in casing 51 to cause motion of the bellows whereupon the rotor is moved from its null so that a signal is developed therein which is communicated to the amplifier to energize motor 13 and actuate the elevator. As the craft returns to the desired altitude level as a result of elevator deflection, the pressure within casing 51 changes until rotor 56 is returned to its null and the signal therein drops to zero while the elevator is returned to its neutral position by follow-up device 16.

As the craft returns to its prescribed altitude as a result of the signal developed within rotor 56, relative displacement occurs between stator 23 and rotor 27 of take-off device 11 to develop a signal in repeater rotor 28 to level off the elevator. If this occurs and the desired altitude has not been attained, a control signal will still be available at rotor 56 to actuate elevator until the desired altitude is attained. The take-off signal and the signal of rotor 56 actually provide an average displacement signal on the elevator so that the craft is returned to and maintained in the desired altitude.

The novel altitude control unit of the present invention, shown diagrammatically in Figure 1, may take the form of Figure 2 where it is shown as comprising a casting 65 having an outer cover or housing 66 secured thereto by way of screws 67. For the purpose of mounting the entire unit in any desired location, cover 66 is provided with a pair of clamp members 68, as shown in Figure 4, engageable with each other through mounting bolts 69. A wall of the casting supports by way of a clamp 70 one end of a bank of evacuated aneroids 71 whose outer walls are exposed to atmospheric pressure outside of the unit by virtue of an opening 72 provided to this end within the outer end of the casting. Thus, with a drop in pressure, the aneroids expand so that their free or lower end moves downwardly while with a rise in pressure the aneroids contract so that their lower end moves upwardly.

The movable end of the aneroids has fastened thereto a block 73 which supports therein a pin 74 carrying a lever 75 which is pivotally connected to a lever arm 76 fastened to a rock-shaft 77 which is suitably journalled within the casting. Motion of the aneroids upwardly or downwardly angularly displaces shaft 77, the free end of which carries a counterweighted gear 78 which meshes with a pinion 79 carried by a shaft 80, the latter being journalled at its ends within two spaced plates 81 and 82. Also supported by shaft 80 is a relatively large gear 83 which, in turn, meshes with a pinion 84 fastened to a shaft 85 which is likewise journalled within the spaced plates, one end of the shaft being extended to support thereon one face 86 of an electromagnetic clutch 87, the engaging face 88 of which is connected through a resilient member 89 to a shaft 90 coaxially mounted with shaft 85.

Clutch faces 86 and 88 are surrounded adjacent their outer periphery by a winding 91 which is adapted for energization, as shown in Figure 1, by a battery 62 upon the closing of switch 63. The electromagnetic clutch illustrated herein is more fully described and claimed in copending application Serial No. 513,421, filed December 8, 1943, now U. S. Patent No. 2,407,757, issued September 17, 1946. Energization of winding 91 urges clutch face 88 outwardly relative to its shaft 90 into engagement with clutch face 86 whereby motion of aneroids 71 is communicated to shaft 90 which supports thereon a wound rotor, similar to rotor 56 of Figure 1, for angular displacement relative to its wound stator, similar to stator 57 of Figure 1, the stator being fixed within a casing 92. Normally, the rotor is maintained at its null position relative to its stator but any motion of the rotor as a result of the contraction or expansion of aneroids 71 from its null develops a control signal in the rotor proportional to the amount of aneroid motion for elevator control as heretofore explained.

To aid the aneroids in the outward movement during expansion, a loading is provided therefor in the nature of a coiled spring 93 anchored at one end to plate 81 and at its other end to a shaft 94, journalled within spaced plates 81 and 82, the shaft supporting thereon a gear 95 which meshes with a pinion 84 mounted on shaft 85. Thus, driving motion of clutch face 86, due to expansion of the aneroids, is aided by spring 93.

With the de-energizaion of coil 91 of the clutch to break the drivable connection between aneroids 71 and shaft 90, unless some means are provided to center or return the wound rotor carried by shaft 90 to its null position, a non-synchronous condition will exist in that the rotor will still have a signal for elevator control and upon subsequent clutch re-engagement the rotor will provide a control signal when the aneroids are not calling for such a signal. To the end that a condition of synchronism will always exist in the system and that subsequent to clutch disengagement the rotor may be returned to its neutral or null position, shaft 90 has an extension projecting from the rear of casing 92 which supports thereon a split bracket 96 carrying a pin 97 which is engaged by a pair of levers 98 and 99 pivoted, respectively at 100 and 101 (Figure 3). The levers are interconnected through a spring 102 which urges both of the levers inwardly to center pin 97 and, therefore, the rotor carried by shaft 90. A limit pin 103 defines the limits of inward motion for both of the levers while eccentric pins 104 and 105 define the outward limits of motion for the levers. Pins 104 and 105 are adjustable to limit the maximum signal in the wound rotor to that required and constitute a safety feature.

Referring now to Figure 3 and assuming clockwise motion of shaft 90 and its rotor as a result of aneroid motion, pin 97 is moved clockwise to urge lever 98 outwardly about its pivot 100 against the action of spring 102. Upon de-energizaiton of winding 91, the drivable connection between the aneroids and the rotor is disconnected so that spring 102 urges lever 98 in a counter-clockwise direction into engagement with pin 103, the lever in so returning urges pin 97 in the same direction whereupon shaft 90 is moved to return its rotor to its normally central or null position. Obviously, as a result of counter-clockwise motion of shaft 90 due to opposite motion of the aneroids, pin 97 urges lever 99 outwardly which, due to the action of spring 102, centers the rotor upon clutch de-energization.

Once the craft, embodying the novel automatic steering system hereof, has attained a desired altitude level, the aneroids will have expanded an amount proportional to the altitude attained but will have no effect on the rotor of the inductive device because the latter is centered and has no driving connection with the aneroids. Clutch 87 is subsequently energized to establish the desired driving connection and any subsequent contraction of the aneroids due to a drop in altitude level or expansion due to a rise in altitude level is immediately manifested in rotor motion from its null whereupon a signal, dependent upon the direction of rotor motion, is developed in the rotor for actuating the elevator to return the craft to the desired altitude level.

As will now be readily apparent to those skilled in the art, a novel and desirable altitude control unit has been provided for use in an automatic steering system to supplement the normal pitch control thereof whereby a craft may be maintained not only in a desired level attitude but will be also maintained automatically at a desired altitude level.

Although only a single embodiment of the present invention has been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

I claim:

1. An automatic pressure control unit comprising a casing having an opening therein for communication with a source of varying pressure, a pressure responsive element mounted in said casing for expansion and contraction due to changes in said pressure, a signal generator in said casing having a wound stator element fixed to said casing and an inductively coupled wound rotor element, a shaft supporting said rotor element for angular motion relative to said stator element, means for yieldably maintaining said rotor element in a predetermined position relative to said stator element, a second shaft journalled in said casing, means for drivably connecting said shafts, means mechanically connecting said second shaft with said pressure responsive element for operation of said second shaft by said pressure responsive element, and spring loading means aiding operation of said second shaft by said pressure responsive element.

2. An automatic pressure control unit comprising a casing having an opening therein for communication with a source of varying pressure, a pressure responsive element mounted in said casing for expansion and contraction due to changes in said pressure, a signal generator in said casing having a wound stator element fixed to said casing and an inductively coupled wound rotor element, a shaft supporting said rotor element for angular motion relative to said stator element and extending beyond both ends of said stator element, means connected to one end of said shaft for yieldably maintaining said rotor element in a predetermined position relative to said stator element including a stop fixedly connected with said stator element, a pair of levers pivotally connected with said stator element and straddling said stop, resilient means urging said levers together, and means connected to said shaft for engaging said levers whereby as said shaft is angularly displaced, one lever is displaced from said stop while the other lever is engaged with said stop and the resulting urging of said resilient means returns said levers into engagement with stop as soon as the shaft displacing force is relieved, a second shaft journalled in said casing and coaxial with said first shaft, a two-part magnetic clutch for drivably connecting said second shaft with said first shaft, one part of said clutch being secured to said second shaft and the other part being secured to the free end of said first shaft, means comprising a gear train for drivably connecting said second shaft for operation by said pressure responsive element, and a coil spring connected with said second shaft for aiding operation of said shaft by said pressure responsive element.

References Cited in the file of this patent

UNITED STATES PATENTS

| 2,415,429 | Kellogg et al. | Feb. 11, 1947 |
| 2,426,213 | Herondelle | Aug. 26, 1947 |

FOREIGN PATENTS

| 37,799 | Netherlands | Apr. 15, 1936 |
| 107,265 | Sweden | Apr. 27, 1943 |